United States Patent [19]

Nortz et al.

[11] Patent Number: 5,095,761
[45] Date of Patent: Mar. 17, 1992

[54] CORIOLIS-TYPE MASS FLOW METER FOR SANITARY USE

[75] Inventors: Gregory J. Nortz; W. Tom Clark, both of Greenwood, S.C.

[73] Assignee: Schlumberger Industries, Inc., Atlanta, Ga.

[21] Appl. No.: 544,784

[22] Filed: Jun. 27, 1990

[51] Int. Cl.⁵ .............................................. G01F 1/84
[52] U.S. Cl. .................................................. 73/861.38
[58] Field of Search ............... 73/861.37, 861.38, 32 A

[56] References Cited

U.S. PATENT DOCUMENTS

| | | | |
|---|---|---|---|
| 4,756,198 | 7/1988 | Levien . | |
| 4,768,385 | 9/1988 | Cage | 73/861.38 |
| 4,831,885 | 5/1989 | Dahlin | 73/861.38 |
| 4,852,410 | 8/1989 | Corwon et al. . | |

FOREIGN PATENT DOCUMENTS 2598801  11/1987  France ............................... 73/861.38

OTHER PUBLICATIONS

Brochure-m Mass Flow Meter Technical Bulletin; Schlumberger Indus. 1989.

Primary Examiner—Herbert Goldstein
Attorney, Agent, or Firm—D. V. Gaudier

[57] ABSTRACT

A Coriolis-type mass flow meter for use in sanitary applications. A pair of sensing tubes have their ends rigidly mounted within bores formed within identical inlet and outlet fixtures. The ends of the tubes fit snugly within the bores and are ends brought out flush with the ends of the bores. The flush ends of the tubes are secured to the bores by means of welding. An annular flange is formed about the flush tube ends of the inlet and outlet fixtures to allow easy assembly and removal of the mass flow meter from its associated fluid flow pipeline or conduit. The inlet and outlet fixtures and tubes preferably are formed from a non-reactive, weldable material such as stainless steel. The mounting arrangement of the tubes within the bores of the inlet and outlet fixtures makes it easy to secure the tube ends to the fixtures by means of welding in a readily accessible location. These welds can then be easily smoothed or polished to remove any possible obstructions to fluid flow or hiding places for contamination. This arrangement results in a mass flow meter which is acceptable for sanitary applications, e.g. the measuring of mass flow and/or density of foodstuffs.

5 Claims, 2 Drawing Sheets

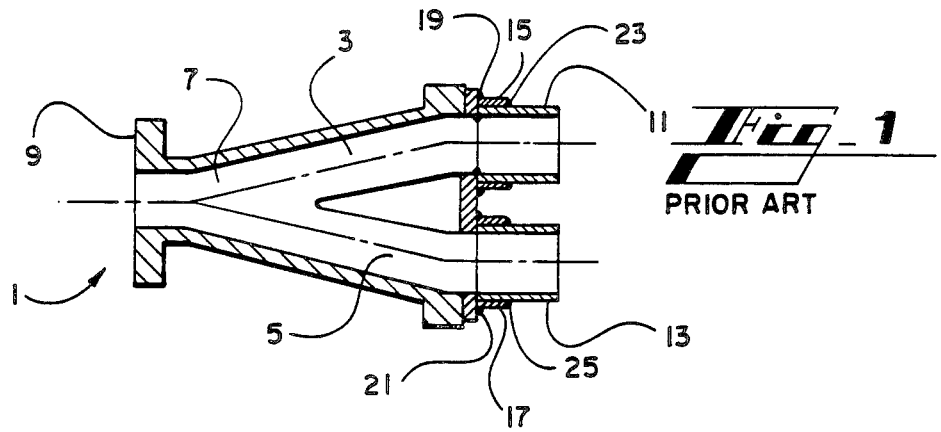
Fig_1 PRIOR ART
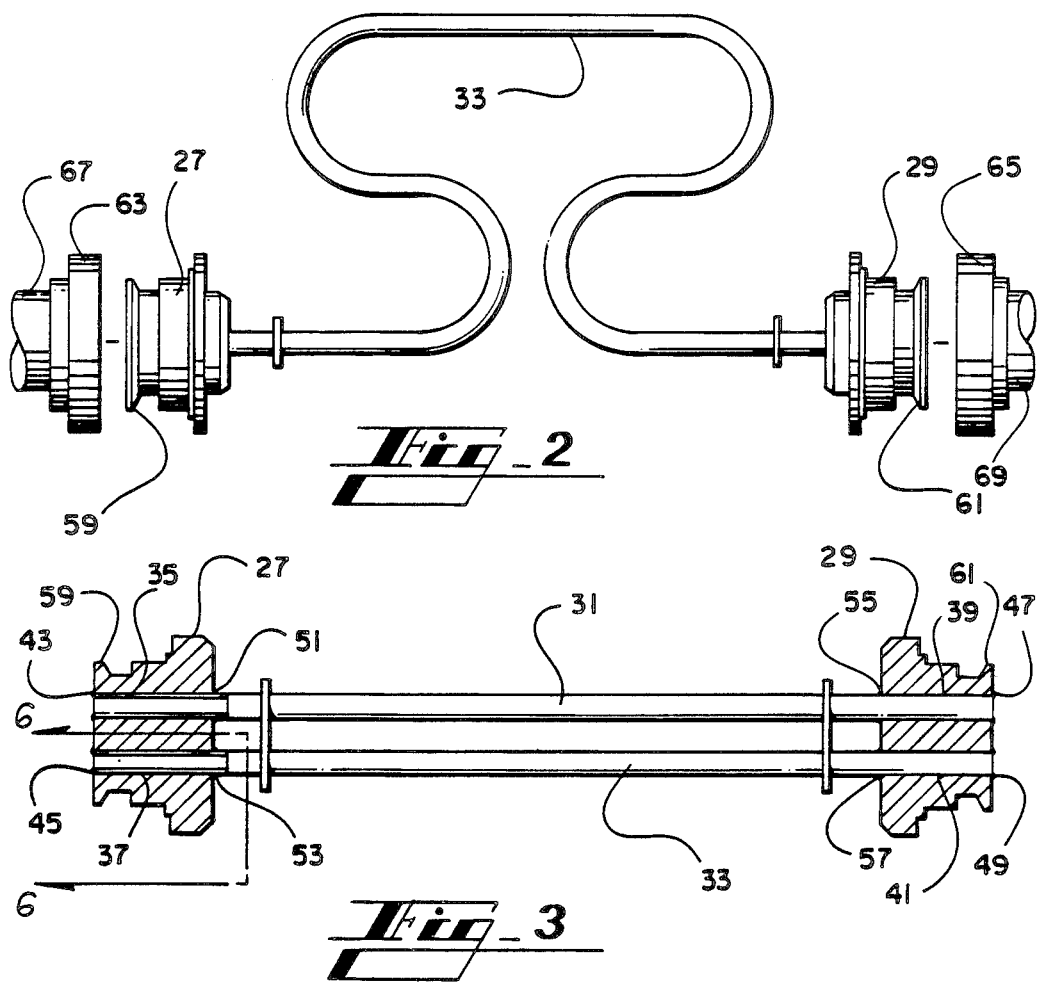
Fig_2
Fig_3

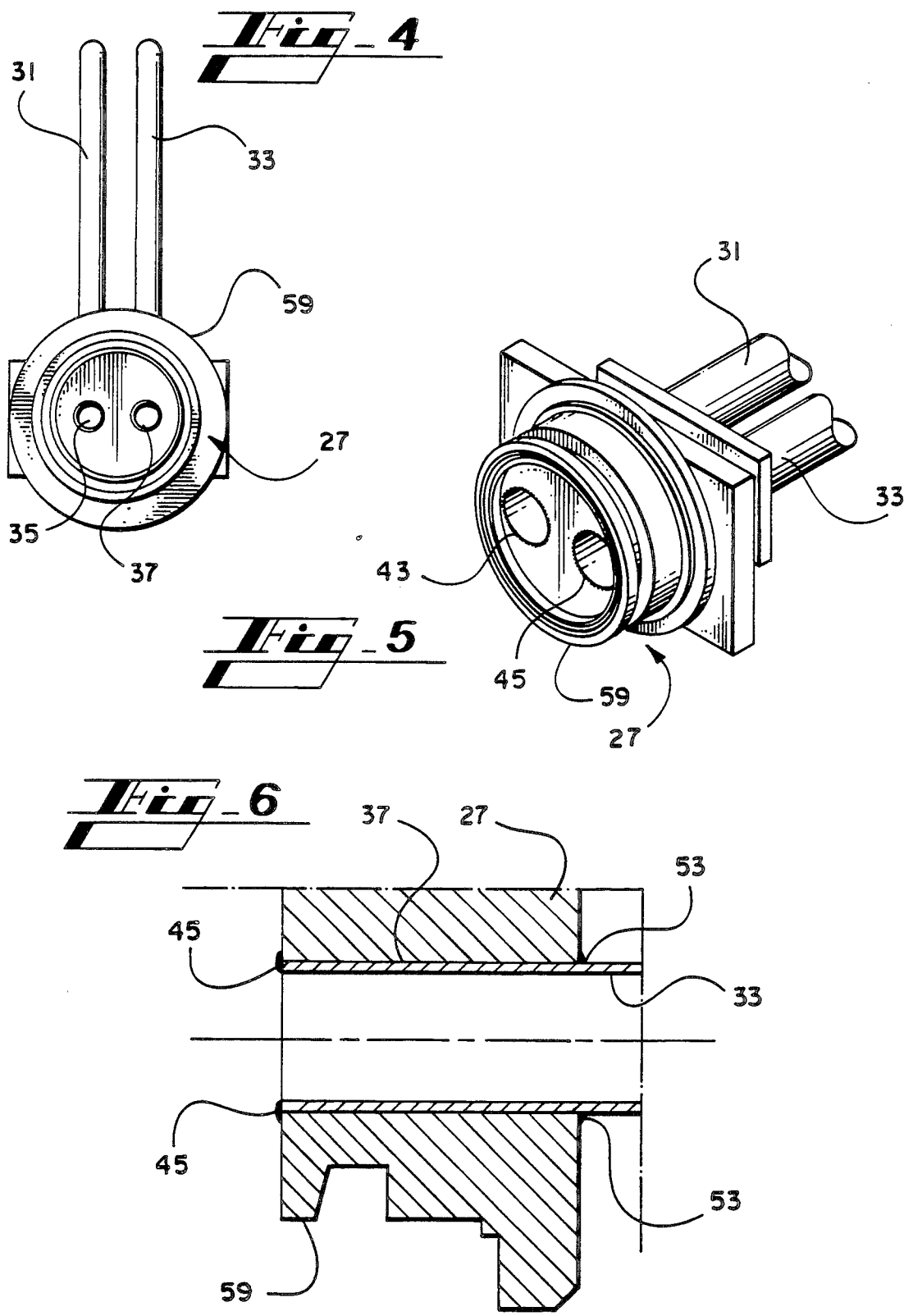

CORIOLIS-TYPE MASS FLOW METER FOR SANITARY USE

BACKGROUND OF THE INVENTION

1. Field of the Invention

The invention relates to mass flow meters of the Coriolis-type and, more particularly, to such a mass flow meter for use in sanitary environments.

2. Description of the Prior Art

Coriolis-type mass flow meters are well known in the art and are used to measure the mass and/or density of a fluid or fluid-like material. Representative examples of such mass flow meters are U.S. Pat. Nos. 4,852,410 and 4,756,198. Although details of construction and operation differ somewhat, in general Coriolis-type mass flow meters utilize a pair of tubes disposed between an inlet and an outlet connected in line to a pipe carrying a fluid or fluid-like material (e.g. a slurry) whose mass and/or density is to be measured. External magnetic drivers are used to vibrate the tubes at a characteristic frequency. A change in the frequency measured by motion sensors arranged on the tubes is indicative of the mass flow rate of the fluid travelling through the tubes.

In their usual arrangement, the tubes are held rigidly fixed at one end by an inlet fixture having a Y-shaped passage which causes fluid entering the inlet fixture from an inlet pipe to be split into two substantially equal streams flowing into the fixed ends of the tubes. The opposite ends of the two tubes are also rigidly fixed to an identical outlet fixture having a Y-shaped passage which causes the streams coming from the two tubes to be recombined and applied to an outlet pipe. Such an arrangement is shown in U.S. Pat. No. 4,852,410 and is used in Schlumberger Industries M brand mass flow meter upon which U.S. Pat. No. 4,852,410 is based.

One drawback to the use of such Y-shaped tube fixtures is that the ends of the tubes must be firmly secured within or to the ends of the Y-shaped passages formed in the fixtures. Generally, the tube ends are secured to the Y-shaped passages by means of welding. This poses several problems. First, this requires that the weld between the interior end of the tube and the inside of each Y-shaped passage be made well inside the fixture. This is a particularly difficult operation when smaller sizes of tubing, e.g. one-half inch (13 mm). are used. Second, it is difficult to machine and polish the inside of the Y-shaped passages sufficiently to prevent surface irregularities from interrupting the smooth flow of fluid through the passages and from leaving any areas where contaminants may hide. Finally, the process of creating a weld between the interior of the tube end and the inside wall of each Y-shaped passage often results in a rough edge or lip surrounding the tube end at the well which is also difficult to make smooth and free of places where contamination may reside.

Such drawbacks are especially significant when a mass flow meter of the type described above is to be used in a so-called "sanitary" environment. For example, mass flow meters may be used to measure the mass and/or density of milk products, food-stuffs, or the like. Metering equipment of this type must meet various sanitary standards and regulations such as the "3-A" Sanitary Standard No. 28-01 of the Sanitary Standards Symbol Administration Council. These standards and regulations require that the metering mechanism be free of areas or obstructions where foodstuffs or contaminants can hide, and that the metering mechanism be easily removable from the fluid flow pipeline to allow for easy cleaning, sanitization, and inspection.

SUMMARY OF THE INVENTION

The present invention provides an arrangement enabling a Coriolis-type mass flow meter of the type shown in U.S. Pat. No. 4,852,410 to meet sanitary specifications. In particular, the invention is a Coriolis-type mass flow meter of the type having an inlet and an outlet, and at least a pair of tubes disposed between the inlet and outlet to allow fluid to flow therebetween. Means are provided for vibrating the tubes and for measuring the frequency of vibration of the tubes and for deriving therefrom a measure of the mass of fluid flowing through the tubes. There is further provided an inlet fixture and an outlet fixture for rigidly holding ends of the pair of tubes, with the inlet fixture and the outlet fixture being substantially identical in structure. Each fixture has a pair of separate and unconnected bores formed therein for receiving the ends of the tubes. The wall of a bore is in contact with an outer surface of its associated tube along the entire length of the bore, with each tube being arranged with its end substantially flush with an end of its associated bore.

Preferably, the tubes and fixtures are formed from a non-reactive and weldable material, such as stainless steel. The tube ends which are flush with the ends of the bores in each fixture may be secured by means of welding between the tube end and bore. The bores of each fixture may be arranged substantially parallel to each other. The inlet fixture and outlet fixture may each include an annular flange formed about each pair of bores in proximity to the ends of the tubes disposed in the bores. The flange is arranged to mate with a complementary connector disposed on an end of a conduit or pipe through which the fluid or fluid-like material flows.

The foregoing arrangement has several advantages over prior-art Y-shaped inlet and outlet tube fixtures. First, since the ends of the tube are brought out flush with their respective bores, the process of welding the tube end to the flush end of the bore takes place in a readily accessible location. This also means that any irregularities in the surface of the resulting weld can be easily filed or ground down to create a smooth area free of discontinuaties or obstructions which may interrupt the smooth flow of fluid into or out of the fixture and which will not create an area where contaminants may hide. This arrangement also eliminates the need to smoothly machine the inside surface of the bores as is the case with prior-art tube fixtures having Y-shaped passages since the bores of the present invention are merely used to locate and secure the ends of the tubes and do not come into contact with the fluid itself. Finally, the provision of an annular flange arranged about the fixtures enables the inlet fixture and outlet fixture to be readily attached or removed from its associated fluid flow conduit or piping.

It will be appreciated that the arrangement of inlet and outlet fixtures and tubes of the present invention minimizes areas where contaminants or foodstuffs may be deposited. Only the flange area of each fixture and the interior surface of the tubes are actually in contact with the fluid to be measured. The flange ends of the fixtures and the tubes themselves may be easily cleaned, sanitized or sterilized and contain no internal welds or seams where contamination or foodstuffs may linger even after cleaning.

BRIEF DESCRIPTION OF THE DRAWING FIGURES

These and other features and advantages of the present invention will be described in the following detailed description of the preferred embodiment, when taken in conjunction with the accompanying drawing figures wherein:

FIG. 1 shows a typical prior-art Y-shaped tube fixture and flow divider;

FIG. 2 is a side plan view of a Coriolis-type mass flow meter having inlet and outlet fixtures constructed in accordance with the principles of the present invention;

FIG. 3 is a top cross-sectional view of the tubes and fixtures shown in FIG. 2;

FIG. 4 is an end plan view of the tubes and fixtures shown in FIG. 2;

FIG. 5 is a detail perspective view of one of the fixtures shown in FIGS. 2 and 3; and FIG. 6 is a detail cross-sectional view of a portion of one of the fixtures of FIG. 2 taken along lines 6—6.

DESCRIPTION OF THE PREFERRED EMBODIMENT

FIG. 1 shows a cross-sectional view of a typical prior-art Y-shaped tube fixture and flow divider, of the type shown in U.S. Pat No. 4,756,198 and incorporated in Schlumberger Industries, Inc.'s M brand mass flow meter upon which U.S. Pat. No. 4,852,410 is based. Inlet and outlet fixtures 1 are identical and have formed therein a Y-shaped set of internal passages 3, 5, and 7, with passages 3 and 5 being the arms of the "Y" and common passage 7 being the base of the "Y". The portion of fixture 1 containing common passage 7 may further include a flange 9 for connecting to an external pipe or conduit. The ends of passages 3 and 5 are adapted to receive a pair of tubes 11 and 13.

In order to minimize disturbances in the transition between tube 11 and 13 and passages 3 and 5, the interior diameter of tube 11 and 13 is normally dimensioned to be the same as the diameter of interior passages 3 and 5.

In order to be able to secure tubes 11 and 13 to the ends of passages 3 and 5 of fixture 1, there are provided a pair of mounting collars 15 and 17 having an interior diameter dimensioned to snugly fit around the exterior dimensions of tubes 11 and 13 Mounting collars 15 and 17 are then secured to fixture 1, e.g. by welding external welds 19 and 21. Tubes 11 and 13 are then inserted into collars 15 and 17 and secured to the collars by welds 23 and 25, respectively.

While the foregoing arrangement or the variation shown in U S. Pat. No. 4,756,198 is adequate for ordinary use, it is difficult to adapt this arrangement to meet the requirements for sanitary applications. This is because the joint between the ends of tubes 11 and 13 and the interior of passages 3 and 5 is not seamless. The area where the interior surface of tubes 11 and 13 adjoins the interior surfaces of passages 3 and 5 can cause disturbances in fluid flow through passages 3 and 5 and tubes 11 and 13, unless it has exactly the same dimensions and degree of smoothness. Furthermore, this joint can act as a trap for contaminants, making it extremely difficult to clean fixture 1 to meet the requirements of sanitary standards. In addition, the Y-shaped passages of fixture 1 are difficult to machine smooth to minimize interruptions to fluid flow and to meet sanitary standards. It is also possible to weld the abutting interior surfaces of tubes 11 and 13 and passages 3 and 5 together to remove the undesirable interior seam. However, such an interior weld is difficult to execute due to its location. In addition, any such weld would need to be smoothed or further polished to ensure that the interior weld did not itself act as an obstruction to fluid flow or as a trap for contaminants. This is especially true when dealing with smaller, e.g. half inch (13 mm). diameter tubing and fixture passages.

FIGS. 2-6 show an improved form of an inlet and outlet fixture for a mass flow meter which is particularly useful for sanitary applications. Identical inlet and outlet fixtures 27 and 29 support the ends of a pair of tubes 31 and 33. The ends of tubes 31 and 33 fit within a pair of bores 35. 37 formed in fixture 27 and bores 39, 41 formed in fixture 29. Bores 35. 37 ant 39, 41 are substantially cylindrical in shape and are dimensioned to snugly receive the ends of tubes 31 and 33 therein. Bores 35. 37 and 39. 41 are separate and unconnected with each other, with bore 35 having a longitudinal axis arranged substantially parallel to that of bore 37. Likewise, the longitudinal axis of bore 39 is arranged substantially parallel to that of bore 41. The ends of tubes 31 and 33 are brought out flush with the ends of bores 35, 37, and 39. 41.

Tubes 31 and 33 and fixtures 27 and 29 are preferably formed from a non-reactive, weldable material, such as stainless steel. The ends of 31 and 33 which are flush with bores 35, 37, and 39, 41 are secured to fixtures 27 and 29 by means of welding as shown in more detail in FIGS. 5 and 6. These welds, indicated at 43, 45 and 47. 49 are easily performed since they are located at a readily accessible area on fixtures 27 and 29. This also enables any slight irregularities in the welds to be easily filed, machined off or polished. If desired, the areas where tubes 31 and 33 exit through the opposite ends of bores 35, 37 and 39, 41 opposite the flush ends of the tubes may also be welded as indicated by reference numerals 51, 53 and 55, 57.

Also shown are flanges 59 and 61 disposed about the flush tube ends of fixtures 27 and 29, respectively. Flanges 59 and 61 are arranged to mate with complementary connectors 63 and 65 associated with the conduit or piping 67 and 69 through which a fluid or fluid-like material which is to be measured by the mass flow meter flows.

Not shown in the drawing figures are means for vibrating tubes 31 and 33 and means for measuring the frequency of vibration of the tubes and deriving therefrom a measure of the mass flow and/or density flowing through tubes 31 and 33. Such vibrating means and measuring and deriving means are shown and discussed in detail in U.S. Pat. No. 4,852,410 whose specification is hereby explicitly incorporated herein by reference. In any event, the vibrating means, and measuring and deriving means are well-known in the art and do not constitute a part of the present invention.

The foregoing arrangement results in a tube end fixture having no interior seams or welds. The only welds in contact with the fluid, welds 43, 45 and 47, 49 are readily accessible meaning that these welds are easy to perform and they can be readily smoothed or polished to the degree required to meet sanitary standards. Furthermore, this arrangement enables all exterior areas (e.g. the flanges) and interior areas (e.g. the tubes) to be easily cleaned or sanitized.

While the present invention has been described in considerable detail, it is understood that various modifications will occur to those skilled in the art, therefore, the foregoing detailed description of the preferred embodiment is not intended to be limitive of the present invention which is defined by the appended claims.

What is claimed is:

1. In a Coriolis-type mass flow meter of the type having an inlet and an outlet, and at least a pair of tubes disposed between the inlet and outlet to allow fluid to flow therebetween, and means for vibrating the tubes and means for measuring the frequency of vibration of the tubes and for deriving therefrom a measure of the mass of fluid flowing through the tubes, the improvement comprising:

an inlet fixture and an outlet fixture for rigidly holding ends of the pair of tubes, the inlet fixture and outlet fixture being identical in structure, each fixture having a pair of separate and unconnected bores formed therein for receiving the ends of the tubes, the wall of a bore being in direct contact with an outer surface of its associated tube, each tube being arranged with its end substantially flush with an end of its associated bore, the tubes and fixtures each being formed from a weldable material and the end of each tube which is flush with its respective bore being secured to the bore by welding and the weld between each tube end and its associated bore having a substantially smooth surface.

2. The meter of claim 1 wherein the inlet fixture and outlet fixture each include an annular flange formed about each pair of bores in proximity to the ends of the tubes disposed in the bores, the flange arranged to mate with a complementary connector disposed on an end of a conduit through which the fluid flows.

3. The meter of claim 1 wherein the bores of each fixture are arranged substantially parallel to each other.

4. The meter of claim 1 wherein the tubes and fixtures are each formed from a weldable, non-reactive material.

5. The meter of claim 4 wherein the material is stainless steel.

* * * * *